United States Patent
Manolakos et al.

(10) Patent No.: US 11,395,301 B2
(45) Date of Patent: Jul. 19, 2022

(54) MUTING PATTERN CONFIGURATION OPTIONS FOR DOWNLINK POSITIONING REFERENCE SIGNALS (PRS)

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/990,609

(22) Filed: Aug. 11, 2020

(65) Prior Publication Data

US 2021/0051645 A1     Feb. 18, 2021

(30) Foreign Application Priority Data

Aug. 12, 2019  (GR) .............................. 20190100347

(51) Int. Cl.
  *H04W 72/04*     (2009.01)
  *H04W 72/08*     (2009.01)
(52) U.S. Cl.
  CPC ..... *H04W 72/048* (2013.01); *H04W 72/0446* (2013.01); *H04W 72/085* (2013.01)
(58) Field of Classification Search
  CPC ............... H04W 72/04; H04W 72/044; H04W 72/0446; H04W 72/048; H04W 72/08;
  (Continued)

(56) References Cited

U.S. PATENT DOCUMENTS 8,725,167 B2   5/2014 Siomina et al.
8,897,182 B2  11/2014 Yoon et al.
(Continued)

FOREIGN PATENT DOCUMENTS

WO      2021023056 A1    2/2021

OTHER PUBLICATIONS

CATT: "DL and UL Reference Signals for NR Positioning," 3GPP Draft, 3GPP TSG RAN WG1 #96bis, R1-1905346, DL and UL Reference Signals for NR Positioning, 3RD Generation Partnership Project (3GPP), Mobile Competence Centre, 650, Route Des Lucioles, F-06921, Sophia-Antipolis Cedex, France, vol. RAN WG1 No. Xi'an, China; Apr. 8, 2019-Apr. 12, 2019, Apr. 3, 2019 (Apr. 3, 2019), XP051707421, 27 pages, Retrieved from the Internet: URL: http://www.3gpp.org/ftp/tsg%5Fran/WG1%5FRL1/TSGR1%5F96b/Docs/R1%2D1905346%2Ezip [retrieved on Apr. 3, 2019] paragraph 3, paragraph 2.6.4, figures 7-11.
(Continued)

Primary Examiner — Siu M Lee
(74) Attorney, Agent, or Firm — Qualcomm Incorporated

(57) ABSTRACT

Disclosed are techniques for wireless communication. In an aspect, a user equipment (UE) receives, from a transmission point, a first positioning reference signal (PRS) muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and measures, during at least one of the
(Continued)

Example where one configured $T_{rep}$-bit muting pattern controls which occasion of the PRS resource set is muted plurality of active PRS occasions of the first subgroup of PRS resources, PRS received from the transmission point.

90 Claims, 15 Drawing Sheets

(58) Field of Classification Search
CPC ............... H04W 72/085; H04W 72/12; H04W 72/1278; H04W 72/1289; H04W 72/1294; H04L 5/003; H04L 5/0048; H04L 5/005; H04L 5/0051
See application file for complete search history.

(56) References Cited

U.S. PATENT DOCUMENTS

| | | | |
|---|---|---|---|
| 9,203,583 B2 | 12/2015 | Siomina et al. | |
| 9,736,629 B2 | 8/2017 | Woo et al. | |
| 9,794,913 B2 | 10/2017 | Lee et al. | |
| 10,349,371 B2 | 7/2019 | Park et al. | |
| 2010/0322184 A1* | 12/2010 | Xiao | H04L 5/0051 370/330 |
| 2013/0122930 A1* | 5/2013 | Woo | H04L 5/0048 455/456.1 |
| 2015/0018010 A1* | 1/2015 | Fischer | H04W 4/023 455/456.2 |
| 2018/0124787 A1* | 5/2018 | Wang | H04W 72/0453 |
| 2018/0217228 A1* | 8/2018 | Edge | H04W 4/02 |
| 2019/0052996 A1* | 2/2019 | Sahai | H04W 36/0088 |
| 2019/0320401 A1* | 10/2019 | Siomina | G01S 5/0226 |
| 2020/0236644 A1* | 7/2020 | Gunnarsson | G01S 5/0236 |
| 2020/0351618 A1* | 11/2020 | Qi | G01S 1/0428 |
| 2021/0076359 A1* | 3/2021 | Sosnin | H04W 72/10 |
| 2021/0160810 A1* | 5/2021 | Zhang | H04W 64/00 |
| 2021/0297215 A1* | 9/2021 | Da | H04W 64/003 |
| 2022/0038239 A1* | 2/2022 | Guo | G01S 5/0236 |

OTHER PUBLICATIONS

International Search Report and Written Opinion—PCT/US2020/045961—ISA/EPO—dated Jan. 25, 2021.

Nokia, et al., "OTDOA Positioning in FeMTC," 3GPP Draft, 3GPP TSG RAN WG1 Meeting #88, R1-1701859, 3RD Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 12, 2017 (Feb. 12, 2017) XP051209024, 4 pages, Retrieved from the Internet: URL: http://www.3gpp.org/ftp/Meetings_3GPP_SYNC/RAN1/Docs/ [retrieved on Feb. 12, 2017] the whole document.

Qualcomm Incorporated: "DL Reference Signals for NR Positioning," 3GPP Draft, 3GPP TSG RAN WG1 #98, R1-1909278, 3RD Generation Partnership Project (3GPP), Mobile Competence Centre, 650, Route Des Lucioles, F-06921, Sophia-Antipolis Cedex, France, vol. RAN WG1. No. Prague, Czech Republic, Aug. 26, 2019-Aug. 30, 2019, Aug. 17, 2019 (Aug. 17, 2019), XP051765883, 20 pages, Retrieved from the Internet: URL: http://www.3gpp.org/ftp/tsg_ran/WG1_RL1/TSGR1_98/Docs/R1-1909278.zip [retrieved on Aug. 17, 2019], the whole document.

ZTE Wistron Telecom AB: "Clarification on Definition of PRS Occasion Group", R2-1709760, 3GPP TSG-RAN2 Meeting #99, Berlin, Germany, Aug. 21, 2017-Aug. 25, 2017, 4 pages.

* cited by examiner

800 →

Muting pattern for PRS resource set i

| OCC ID \ PRS Group ID | 0 | 1 | 2 | ... | $N_{group}^{(i)}-1$ |
|---|---|---|---|---|---|
| 0 | 1 | | | | |
| 1 | 0 | | | | |
| 2 | 1 | | | | |
| 3 | 1 | | | | |
| ... | | | | | |
| ... | | | | | |
| 14 | 1 | | | | |
| $N_{occasions}^{(i)}-1$ | 1 | | | | |

1000 →

Muting pattern for PRS resource set i

| OCC ID \ PRS Group ID | 0 | 1 | 2 | ... | $N_{group}^{(i)}-1$ |
|---|---|---|---|---|---|
| 0 | 1 | | | | |
| 1 | 0 | | | | |
| 2 | 1 | | | | |
| 3 | 1 | | | | |
| ... | | | | | |
| ... | | | | | |
| 14 | 1 | | | | |
| $N_{occasions}^{(i)}-1$ | 1 | | | | |

Configuration includes only this column

| OCC ID | Subgroups of PRS resource set 1 | | | | Subgroups of PRS resource set 2 | | Subgroups of PRS resource set 3 | |
|---|---|---|---|---|---|---|---|---|
| | 0 | 1 | 2 | ... | $N^{(1)}_{group}-1$ | 0 | $N^{(2)}_{group}-1$ | 0 | $N^{(3)}_{group}-1$ |
| 0 | 1 | | | | | 1 | | 1 | |
| 1 | 0 | | | | | 0 | | 0 | |
| 2 | 1 | | | | | 1 | | 1 | |
| 3 | 1 | | | | | 1 | | 1 | |
| ... | | | | | | | | | |
| 14 | 1 | | | | | 1 | | 1 | |
| $N^{(i)}_{occasions}-1$ | 1 | | | | | 1 | | 1 | |

Ordered sequence of PRS resource sets with the same periodicity

1100 →

Muting pattern for PRS resource set i

| OCC ID \ PRS Group ID | 0 | 1 | 2 | ... | $N_{group}^{(i)}-1$ |
|---|---|---|---|---|---|
| 0 | 1 | 1 | 1 | | |
| 1 | 0 | 1 | 1 | | |
| 2 | 1 | 0 | 1 | | |
| 3 | 1 | 1 | 0 | | |
| ... | | 1 | 1 | | |
| ... | | | | | |
| 14 | 1 | 1 | 1 | | |
| $N_{occasions}^{(i)}-1$ | 1 | 1 | 1 | | |

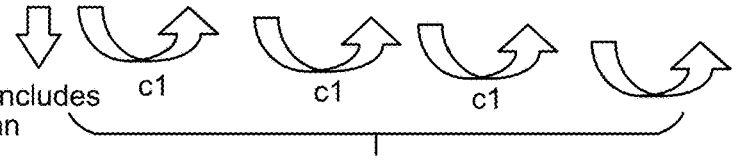

Configuration includes only this column $c_i$ are provided in the configuration: cyclic shift, or a permutation index. In this case, the muting pattern of each subgroup can be changed compared to the configured N-bit bitfield, without having to provide a whole N-bit bitfield

Muting pattern for PRS resource set i

| OCC ID \ PRS Group ID | 0 | 1 | 2 | ... | $N_{group}^{(i)}-1$ |
|---|---|---|---|---|---|
| 0 | 1 | | | | |
| 1 | 0 | | | | |
| 2 | 1 | | | | |
| 3 | 1 | | | | |
| ... | | | | | |
| ... | | | | | |
| 14 | 1 | | | | |
| $N_{occasions}^{(i)}-1$ | 1 | | | | |

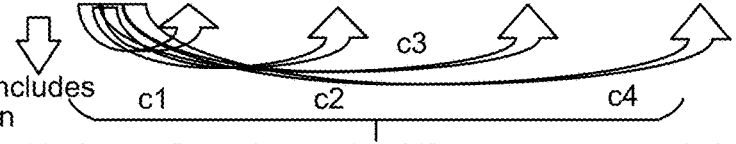

Configuration includes only this column $c_i$ are provided in the configuration: cyclic shift, or a permutation index. In this case, the muting pattern of each subgroup can be changed compared to the configured N-bit bitfield, without having to provide a whole N-bit bitfield

FIG. 12

MUTING PATTERN CONFIGURATION OPTIONS FOR DOWNLINK POSITIONING REFERENCE SIGNALS (PRS)

CROSS-REFERENCE TO RELATED APPLICATION

The present Application for Patent claims priority under 35 U.S.C. § 119 to Greek Patent Application No. 20190100347, entitled "MUTING PATTERN CONFIGURATION OPTIONS FOR DOWNLINK POSITIONING REFERENCE SIGNALS (PRS)," filed Aug. 12, 2019, assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a transmission point, a first positioning reference signal (PRS) muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and measuring, during at least one of the plurality of active PRS occasions of the first subgroup of PRS resources, PRS received from the transmission point.

In an aspect, a method of wireless communication performed by a transmission point includes transmitting, to a UE, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and transmitting PRS to the UE during at least one of the plurality of active PRS occasions of the first subgroup of PRS resources.

In an aspect, a UE includes a memory, at least one transceiver, and at least one processor communicatively coupled to the memory and the at least one transceiver, the at least one processor configured to: receive, from a transmission point via the at least one transceiver, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and measure, during at least one of the plurality of active PRS occasions of the first subgroup of PRS resources, PRS received from the transmission point.

In an aspect, a transmission point includes a memory, at least one transceiver, and at least one processor communicatively coupled to the memory and the at least one transceiver, the at least one processor configured to: cause the at least one transceiver to transmit, to a UE, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and cause the at least one transceiver to transmit PRS to the UE during at least one of the plurality of active PRS occasions of the first subgroup of PRS resources.

In an aspect, a UE includes means for receiving, from a transmission point, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and means for measuring, during at least one of the plurality of active PRS occasions of the first subgroup of PRS resources, PRS received from the transmission point.

In an aspect, a transmission point includes means for transmitting, to a UE, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and means for transmitting PRS to the UE during at least one of the plurality of active PRS occasions of the first subgroup of PRS resources.

In an aspect, a non-transitory computer-readable medium storing computer-executable instructions includes computer-executable instructions comprising at least one instruction instructing a UE to receive, from a transmission point, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and at least one instruction instructing the UE to measure, during at least one of the plurality of active PRS occasions of the first subgroup of PRS resources, PRS received from the transmission point.

In an aspect, a non-transitory computer-readable medium storing computer-executable instructions includes computer-executable instructions comprising at least one instruction instructing a transmission point to send, to a UE, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources, and at least one instruction instructing the transmission point to transmit PRS to the UE during at least one of the plurality of active PRS occasions of the first subgroup of PRS resources.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 is an exemplary table of the muting pattern for a given PRS resource set, according to aspects of the disclosure.

FIG. 9 is an exemplary table of the muting pattern for an ordered sequence of PRS resource sets with the same periodicity, according to aspects of the disclosure.

FIGS. 10 to 12 illustrate exemplary tables of the muting patterns for given PRS resource sets, according to aspects of the disclosure.

DETAILED DESCRIPTION

Figure 1:
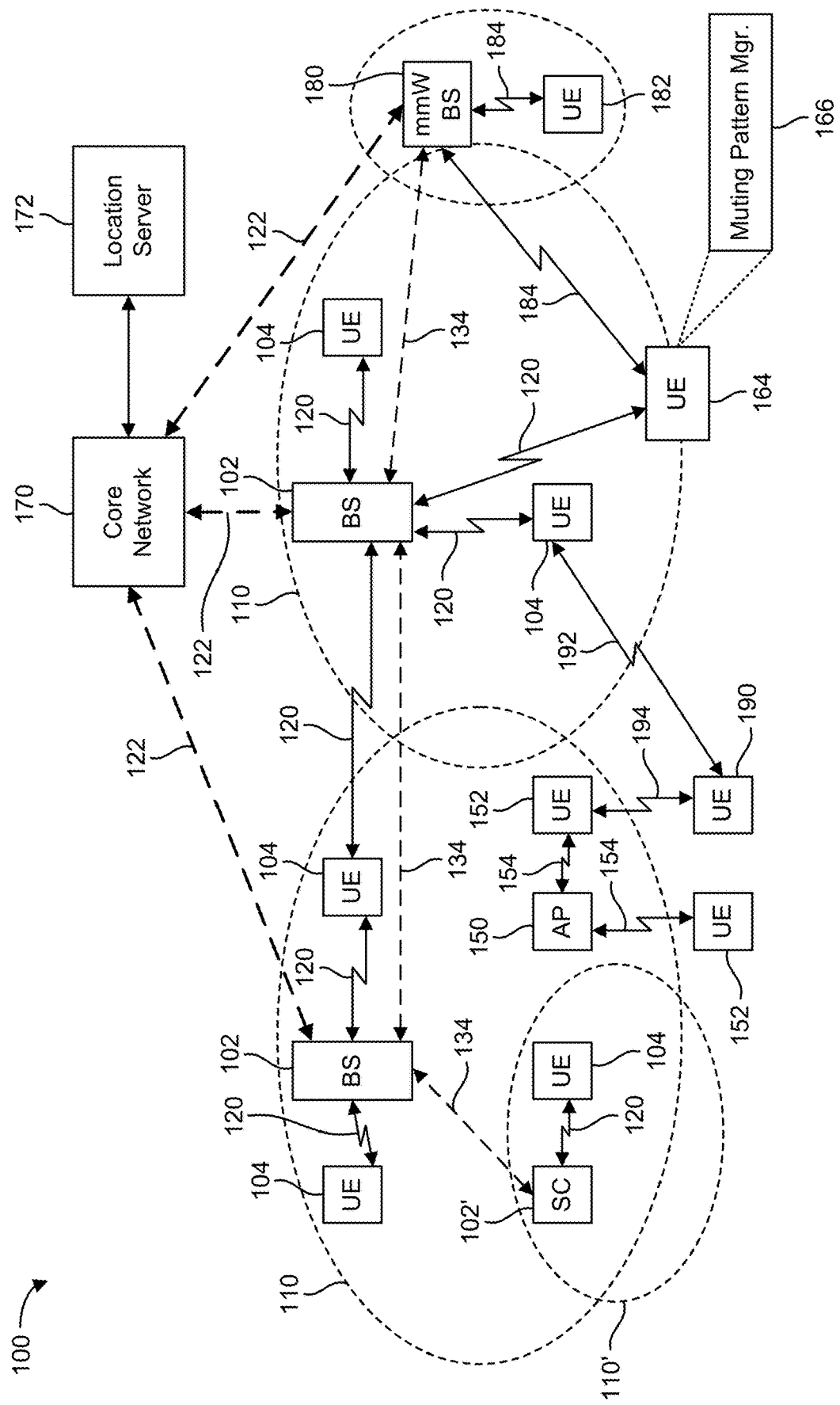
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While geographic coverage areas 110 of neighboring macro cell base stations 102 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in an unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a muting pattern manager 166 that may enable the UE 164 to perform the UE operations described herein. Note that although only one UE in FIG. 1 is illustrated as having a muting pattern manager 166, any of the UEs in FIG. 1 may be configured to perform the UE operations described herein.

Figure 2A:
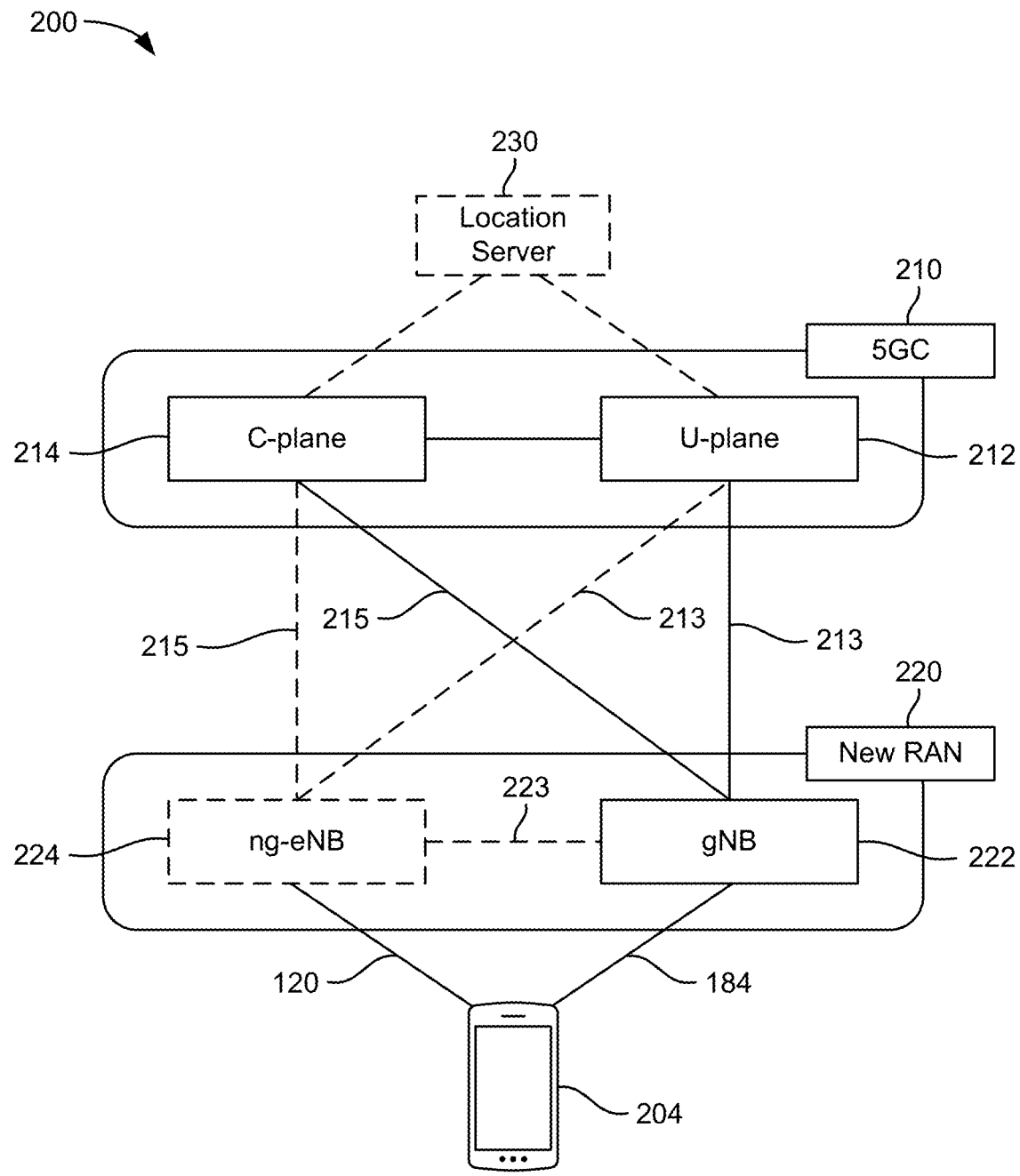
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
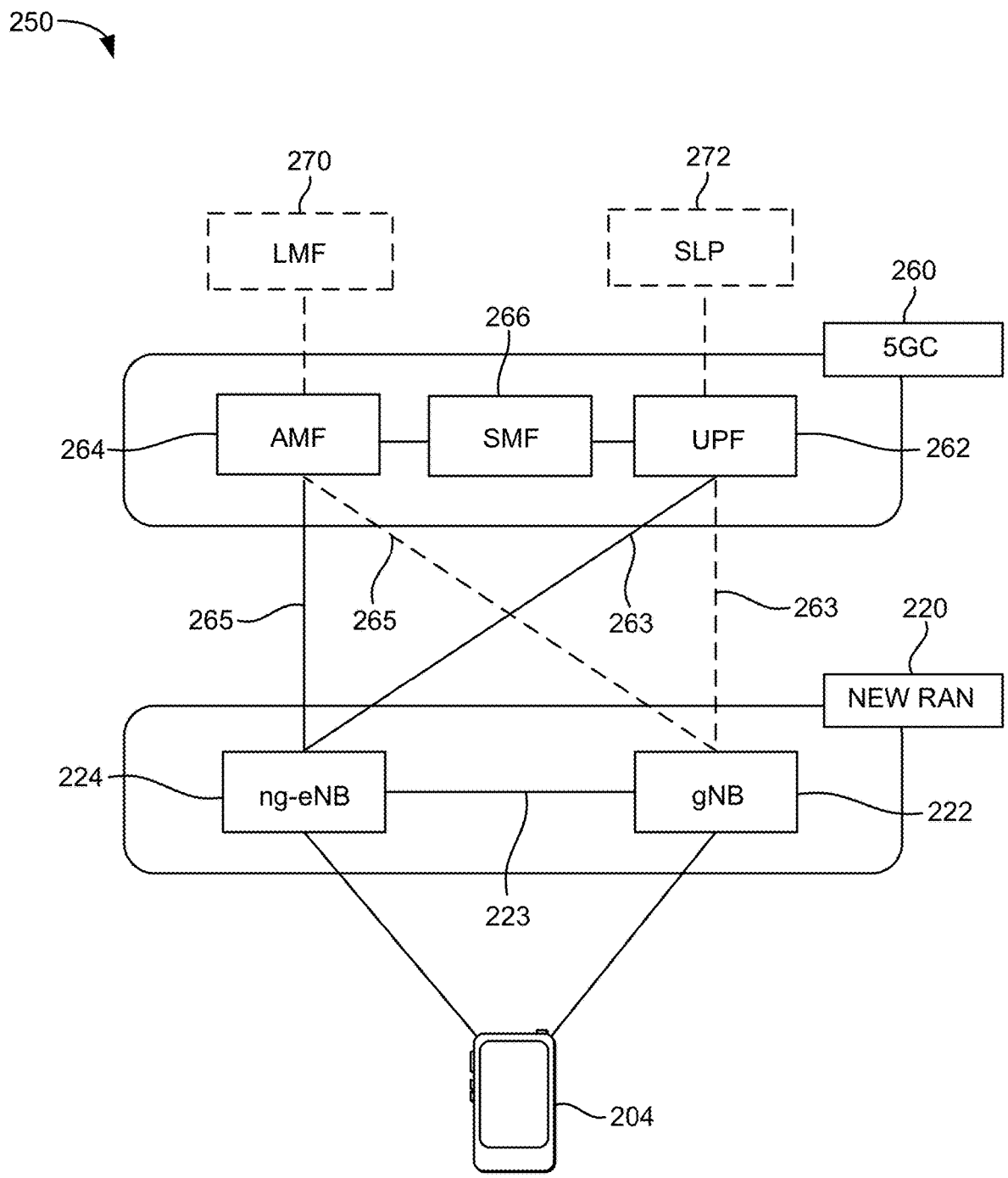

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
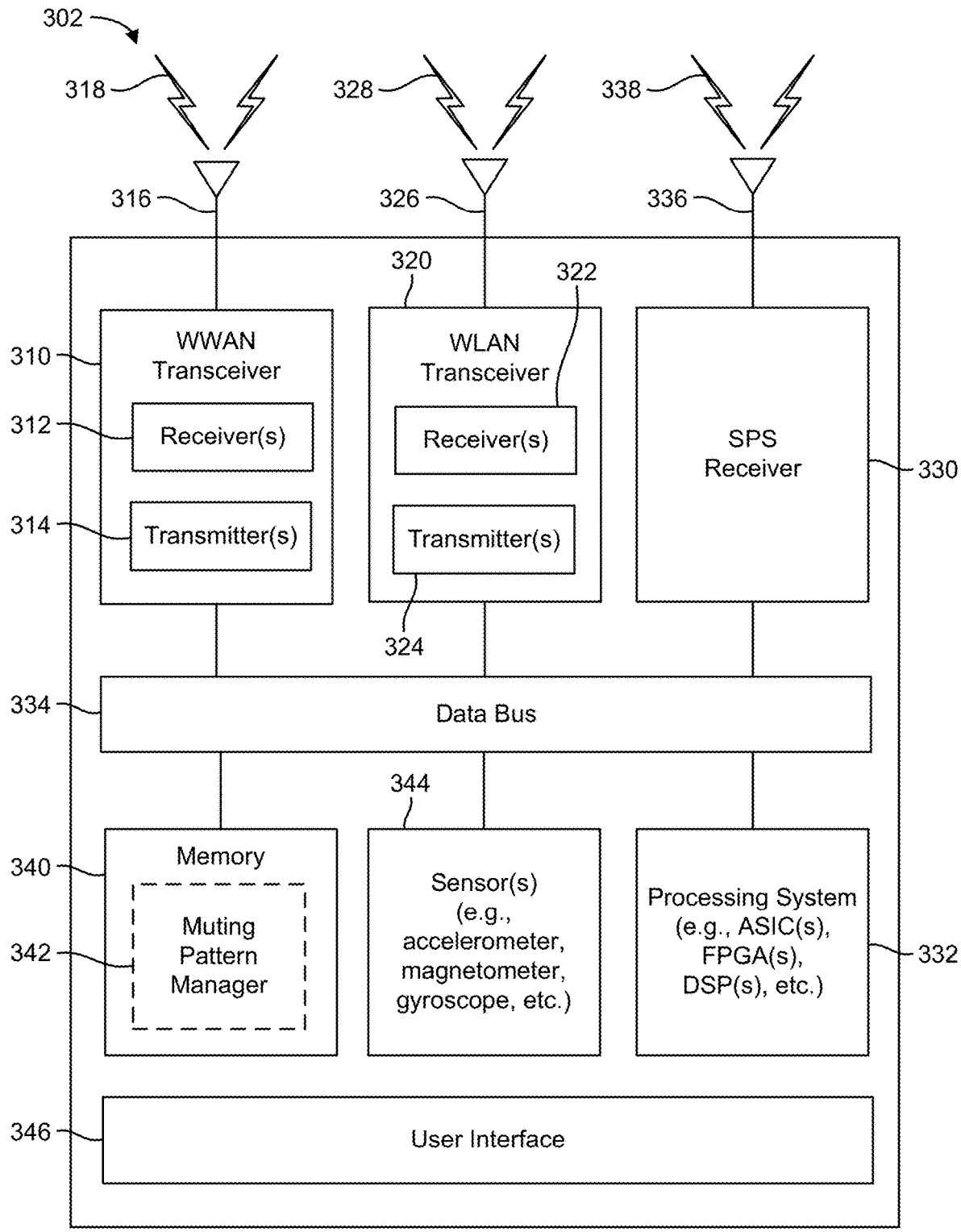
FIGS. 3A to 3C are simplified block diagrams of several sample aspects of components that may be employed in a UE, a base station, and a network entity, respectively.
Figure 3B:
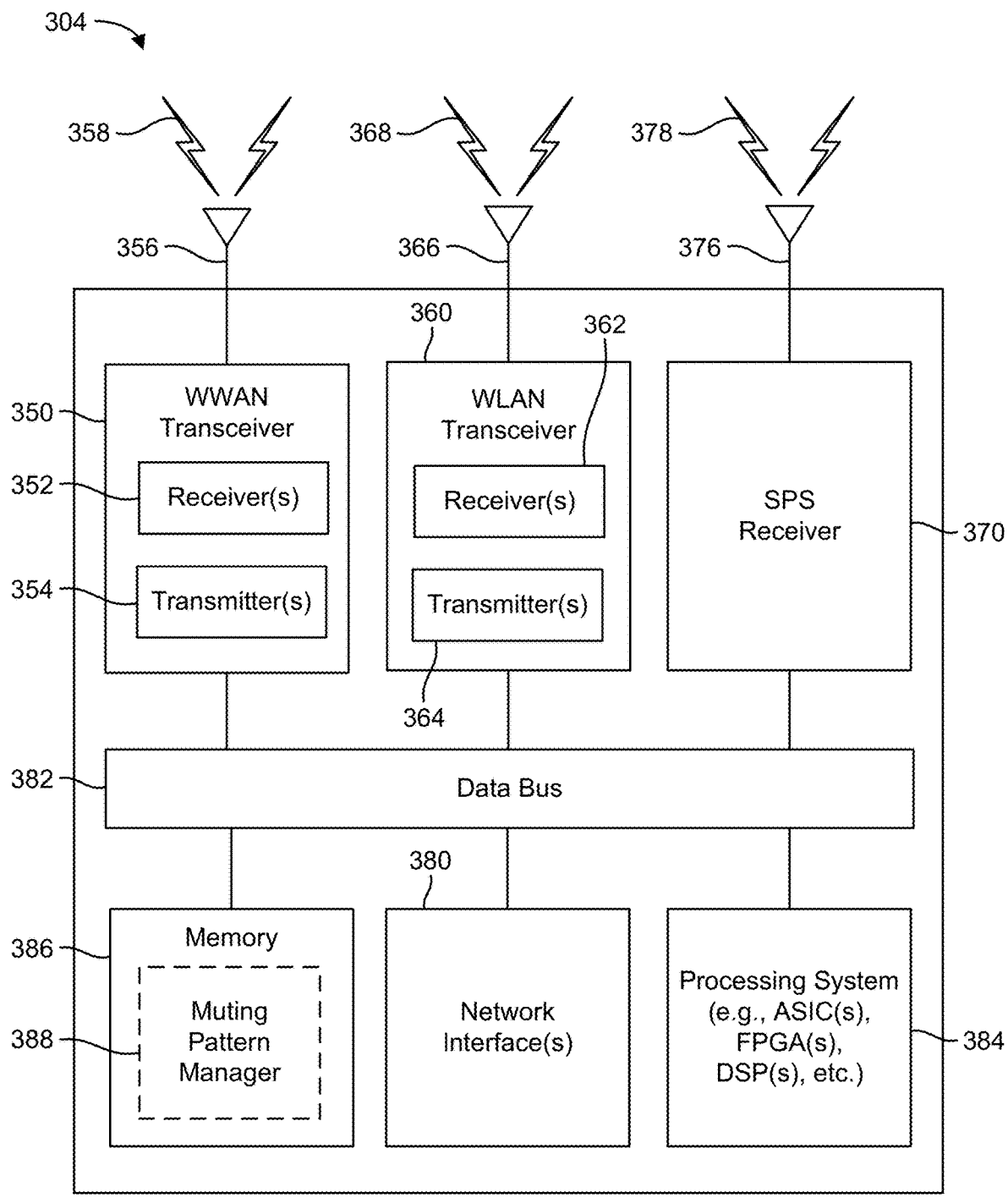
Figure 3C:
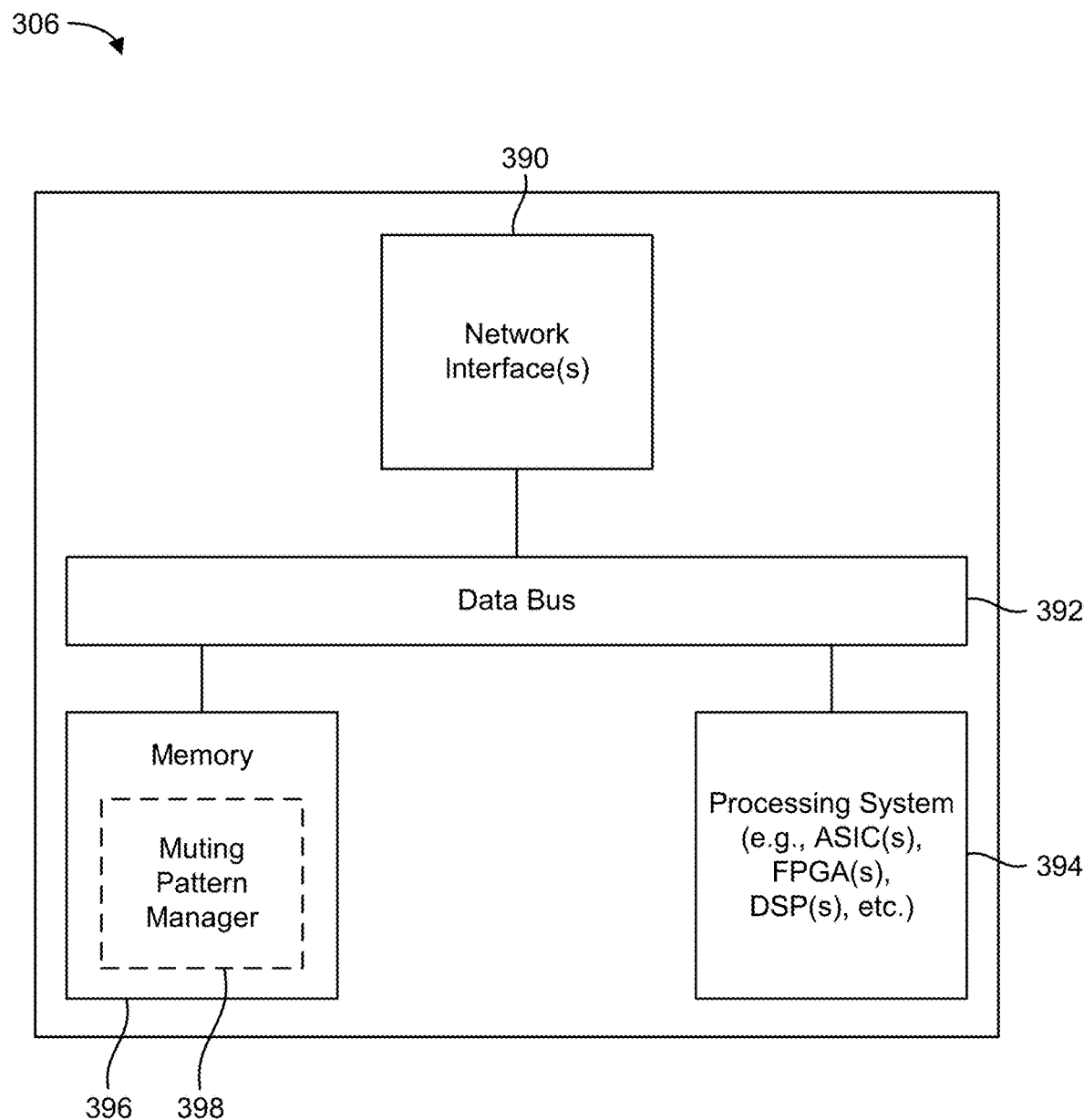

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include muting pattern managers 342, 388, and 398, respectively. The muting pattern managers 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the muting pattern managers 342, 388, and 398 may be external to the processing systems 332, 384, and 394 (e.g., part of a modem processing system, integrated with another processing system, etc.). Alternatively, the muting pattern managers 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, and 394, the transceivers 310, 320, 350, and 360, the memory components 340, 386, and 396, the muting pattern managers 342, 388, and 398, etc.

Figure 4:
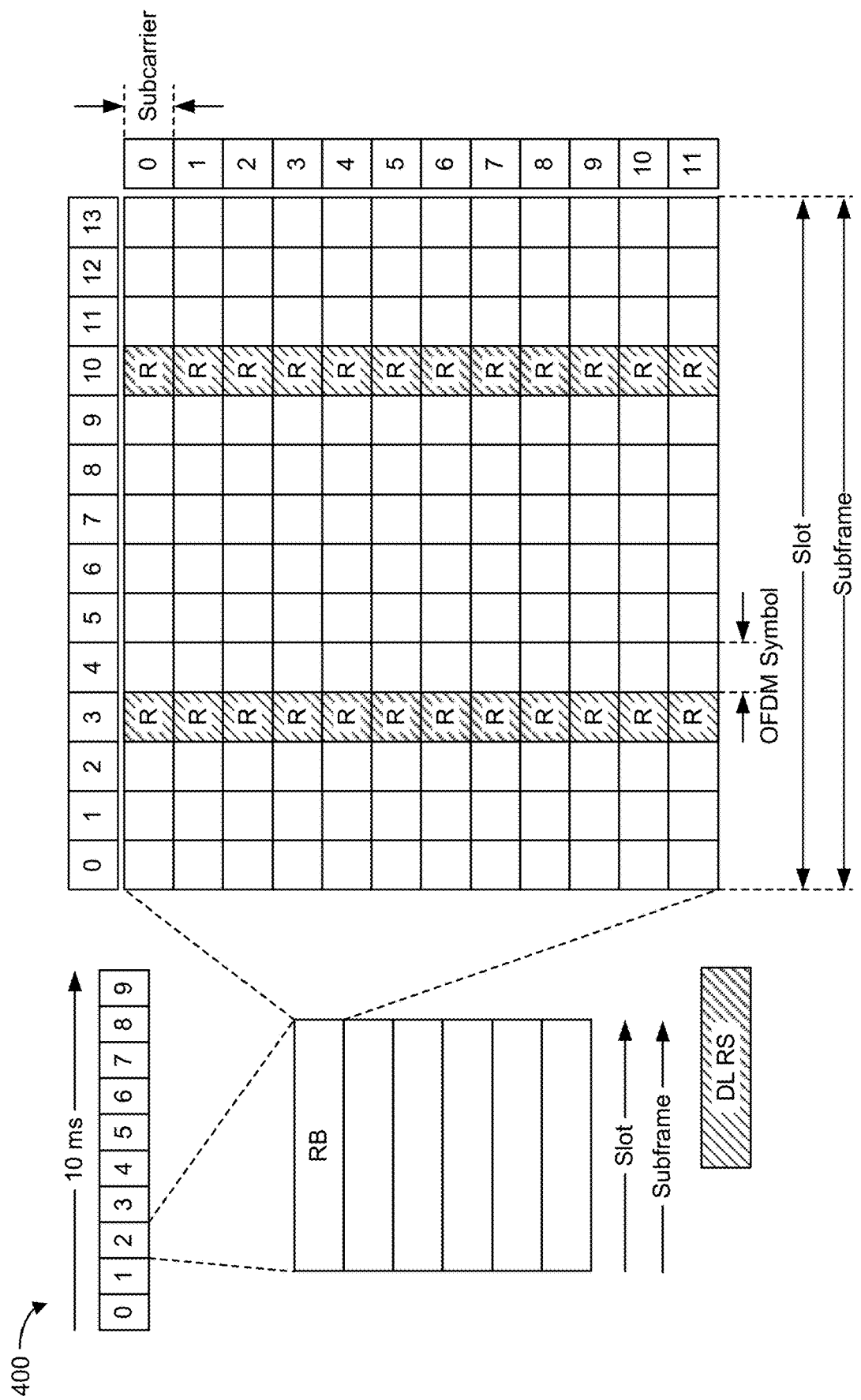
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 is a diagram 400 illustrating an example of a downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Slot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIG. 4, a numerology of 15 kHz is used. Thus, in the time domain, a frame (e.g., 10 ms) is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 4.

A collection of resource elements (REs) that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with μ=0, 1, 2, 3. The repetition factor may have a length selected from $\{1, 2, 4, 6, 8, 16, 32\}$ slots.

A PRS resource ID in a PRS resource set is associated with a single beam (and/or a beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," a "positioning instance," a "repetition of PRS resources," or simply an "occasion," an "instance," or a "repetition."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE, NRS in 5G, TRS, CRS, CSI-RS, DMRS, PSS, SSS, SSB, etc.

There are currently two alternatives for periodic PRS resource allocation. The first alternative is that the periodicity of downlink PRS resources is configured at the downlink PRS resource set level. In this case, a common period is used for downlink PRS resources within a downlink PRS resource set. The second alternative is that the periodicity of downlink PRS resources is configured at the downlink PRS resource level. In this case, different periods can be used for downlink PRS resources within a downlink PRS resource set.

Figure 5:
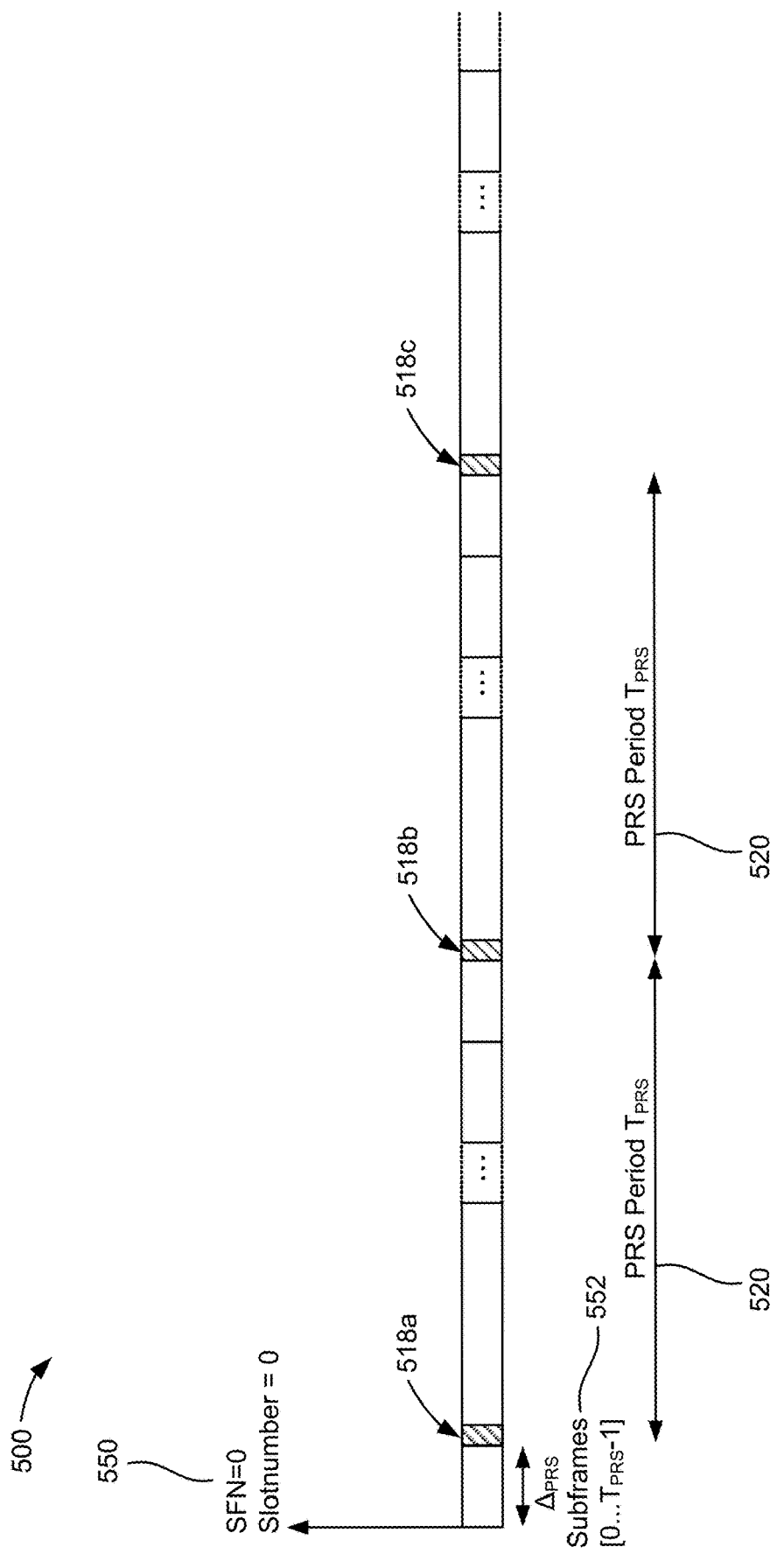
FIGS. 5 and 6 are diagrams illustrating further aspects of positioning reference signal transmission for a cell supported by a wireless node.

FIG. 5 illustrates an exemplary PRS configuration 500 for a cell/TRP supported by a wireless node (e.g., a base station). FIG. 5 shows how PRS positioning occasions are determined by a system frame number (SFN), a cell-specific subframe offset ($\Delta_{PRS}$) 552, and a PRS periodicity ($T_{PRS}$) 520. Typically, the cell-specific PRS subframe configuration is defined by a PRS configuration index ($I_{PRS}$) included in positioning assistance data. The PRS periodicity ($T_{PRS}$) 520 and the cell-specific subframe offset ($\Delta_{PRS}$) are defined based on the PRS configuration index ($I_{PRS}$), as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |

TABLE 2-continued

| PRS configuration Index $I_{PRS}$ | PRS periodicity $T_{PRS}$ (subframes) | PRS subframe offset $\Delta_{PRS}$ (subframes) |
|---|---|---|
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS configuration is defined with reference to the SFN of the cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell-specific subframe offset $\Delta_{PRS}$ 552 may be defined in terms of the number of subframes transmitted starting from SFN 0 ("Slot number=0," marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. Note that while $N_{PRS}$ may specify the number of consecutive positioning subframes per occasion, it may instead specify the number of consecutive positioning slots, based on implementation. For example, in LTE, $N_{PRS}$ specifies the number of consecutive positioning subframes per occasion, whereas in NR, $N_{PRS}$ specifies the number of consecutive positioning slots per occasion.

In some aspects, when a UE receives a PRS configuration index $I_{PRS}$ in the positioning assistance data for a particular cell, the UE may determine the PRS periodicity ($T_{PRS}$) 520 and PRS subframe offset $\Delta_{PRS}$ using Table 2. The UE may then determine the radio frame, subframe, and slot when a PRS is scheduled in the cell (e.g., using the equation above). The positioning assistance data may be determined by, for example, the location server, and include assistance data for a reference cell and a number of neighbor cells supported by various wireless nodes.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations) may be aligned on both frame boundary and system frame number. Therefore, in SFN-synchronous networks, all cells supported by the various wireless nodes may use the same PRS configuration index $I_{PRS}$ for any particular frequency of PRS transmission. On the other hand, in SFN-asynchronous networks, the various wireless nodes may be aligned on a frame boundary, but not system frame number. Thus, in SFN-asynchronous networks, the PRS configuration index $I_{PRS}$ for each cell may be configured separately by the network so that PRS occasions align in time.

A UE may determine the timing of the PRS occasions of the reference and neighbor cells for positioning, if the UE can obtain the cell timing (e.g., SFN) of at least one of the cells, such as a reference cell or a serving cell. The timing of the other cells may then be derived by the UE based, for example, on the assumption that PRS occasions from different cells overlap.

For LTE systems, the sequence of subframes used to transmit PRS (e.g., for positioning) may be characterized and defined by a number of parameters, comprising: (i) a reserved block of bandwidth (BW), (ii) the PRS configuration index $I_{PRS}$(iii) the duration $N_{PRS}$, (iv) an optional muting pattern, and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described, and may, for example, use a low PRS duty cycle (e.g., $N_{PRS}=1$, $T_{PRS}=160$ subframes) or a high duty cycle.

Figure 6:
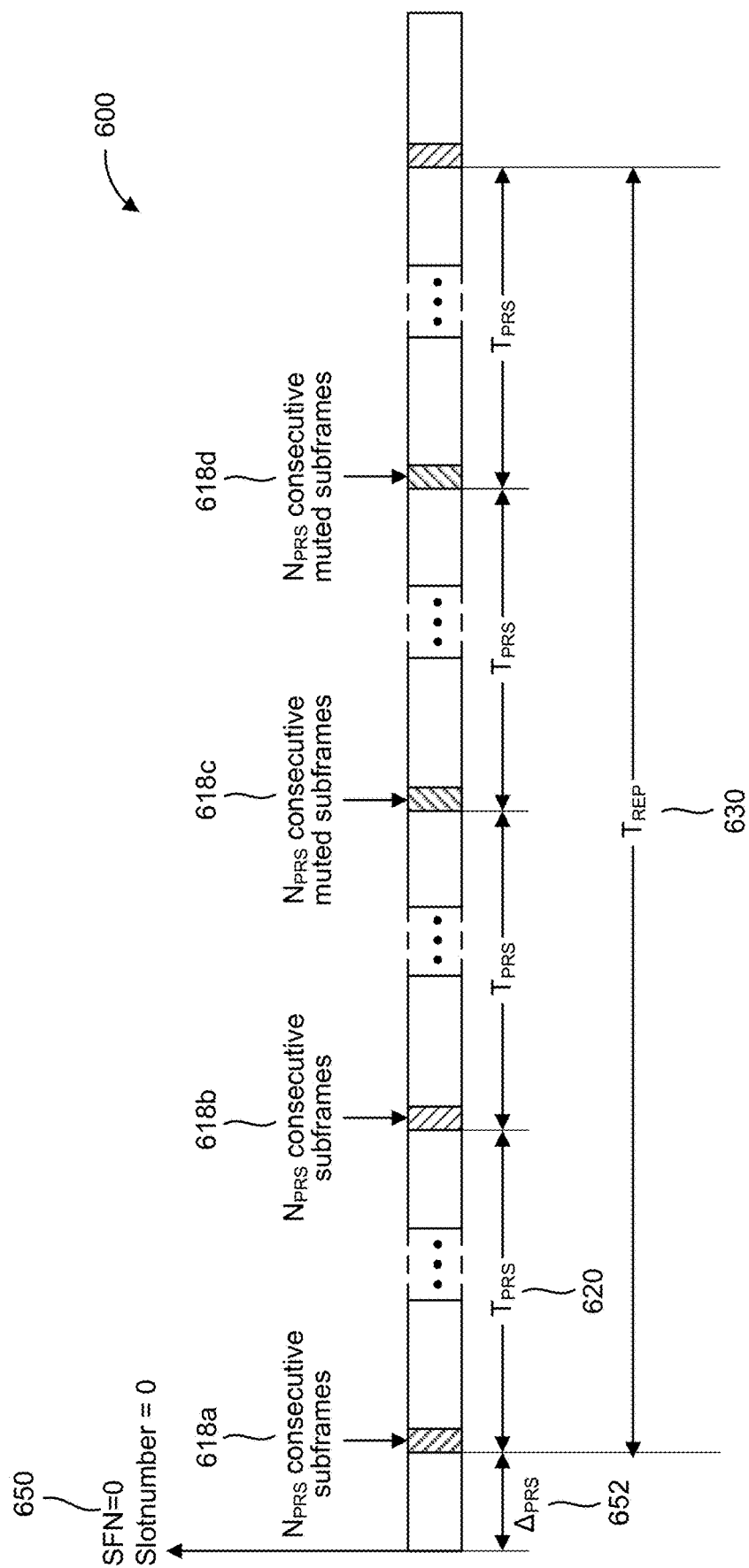

FIG. 6 illustrates an exemplary PRS configuration 600 that includes a PRS muting sequence (also referred to as a "muting pattern"), according to aspects of the disclosure. Like FIG. 5, FIG. 6 shows how PRS positioning occasions are determined by an SFN, a cell-specific subframe offset ($\Delta_{PRS}$) 652, and the PRS Periodicity ($T_{PRS}$) 620. As shown in FIG. 6, the cell-specific subframe offset $\Delta_{PRS}$ 652 may be defined in terms of the number of subframes transmitted starting from SFN 0 ("Slot number=0," marked as slot 650) to the start of the first (subsequent) PRS positioning occasion. In the example in FIG. 6, the number of consecutive positioning subframes ($N_{PRS}$) in each of the consecutive PRS positioning occasions 618a and 618b equals four.

Within each positioning occasion, PRS are generally transmitted with a constant power. A PRS can also be transmitted with zero power (i.e., muted). Muting, which turns off a regularly scheduled PRS transmissions, may be useful when PRS between different cells overlap by occurring at the same or almost the same time. In this case, the PRS from some cells may be muted while PRS from other cells are transmitted (e.g., at a constant power). Muting may aid signal acquisition and time of arrival (ToA) and reference signal time difference (RSTD) measurements, by UEs, of PRS that are not muted (by avoiding interference from PRS that have been muted). For example, when the (strong) PRS the UE receives from one base station is muted, the (weak) PRS from a neighboring base station (with the same frequency shift) can be more easily detected by the UE. Muting may be viewed as the non-transmission of a PRS for a given positioning occasion for a particular cell. Muting patterns may be signaled to a UE using bit strings having a length of 2, 4, 8, or 16 bits (corresponding to the selected $T_{REP}$). If a bit in the bit string is set to '0,' then the UE infers that all PRS are muted in the corresponding positioning occasion.

With reference to FIG. 6, the muting sequence periodicity $T_{REP}$ 630 includes two consecutive PRS positioning occasions 618a and 618b followed by two consecutive muted PRS positioning occasions 618c and 618d. In LTE, the PRS muting configuration of a cell is only defined by a periodic muting sequence (e.g., muting sequence periodicity $T_{REP}$ 630), as opposed to an aperiodic or semi-persistent muting sequence. As such, in LTE, the two consecutive PRS positioning occasions 618a and 618b followed by the two consecutive muted PRS positioning occasions 618c and 618d will repeat for the next muting sequence periodicity $T_{REP}$ 630.

To further improve hearability of PRS, positioning subframes/slots may be low-interference subframes/slots that are transmitted without user data channels. As a result, in ideally synchronized networks, PRS may receive interference from other cells' PRS with the same PRS pattern index (i.e., with the same frequency shift), but not from data transmissions. The frequency shift, in LTE for example, is defined as a function of a PRS ID for a cell or other transmission point (TP) (denoted as $N_{ID}^{PRS}$) or as a function of a PCI (denoted as $N_{ID}^{cell}$) if no PRS ID is assigned, which results in an effective frequency re-use factor of six.

To also improve hearability of PRS (e.g., when PRS bandwidth is limited such as with only six resource blocks corresponding to 1.4 MHz bandwidth), the frequency band for consecutive PRS positioning occasions (or consecutive PRS subframes/slots) may be changed in a known and predictable manner via frequency hopping. In addition, a cell supported by a wireless node may support more than one PRS configuration (e.g., PRS configuration 500/600), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some cases, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Note that a PRS configuration, as described above, including the PRS transmission/muting schedule, is signaled to the UE to enable the UE to perform PRS positioning measurements. The UE is not expected to blindly perform detection of PRS configurations.

In LTE, a PRS configuration (e.g., PRS configuration 500/600) was initially signaled with 16 bits, and later with 1024 bits. The bits of a PRS configuration (whether 16 bits or 1024 bits) signal which PRS occasions are ON (i.e., active, not muted), after which the pattern repeats. In NR, a base station can configure one or more PRS resource sets, where each PRS resource set contains one or more PRS resources. A PRS resource set is associated with some periodicity $T_{PRS}$. A PRS resource set may have up to 128 PRS resources, which could result in a 128-bit bitmap representing which PRS resources are ON and OFF (i.e., inactive, muted) in a specific PRS occasion. In that case, 16 128-bit bitmaps would be needed for every PRS resource set, where each bitmap equals the number of PRS resources in the PRS resource set (up to 128 bits), so that an indication of which beams are muted is provided for each PRS occasion. As would be appreciated, the foregoing could cause, in the worst case, very high configuration overhead in the positioning assistance data.

Figure 7:
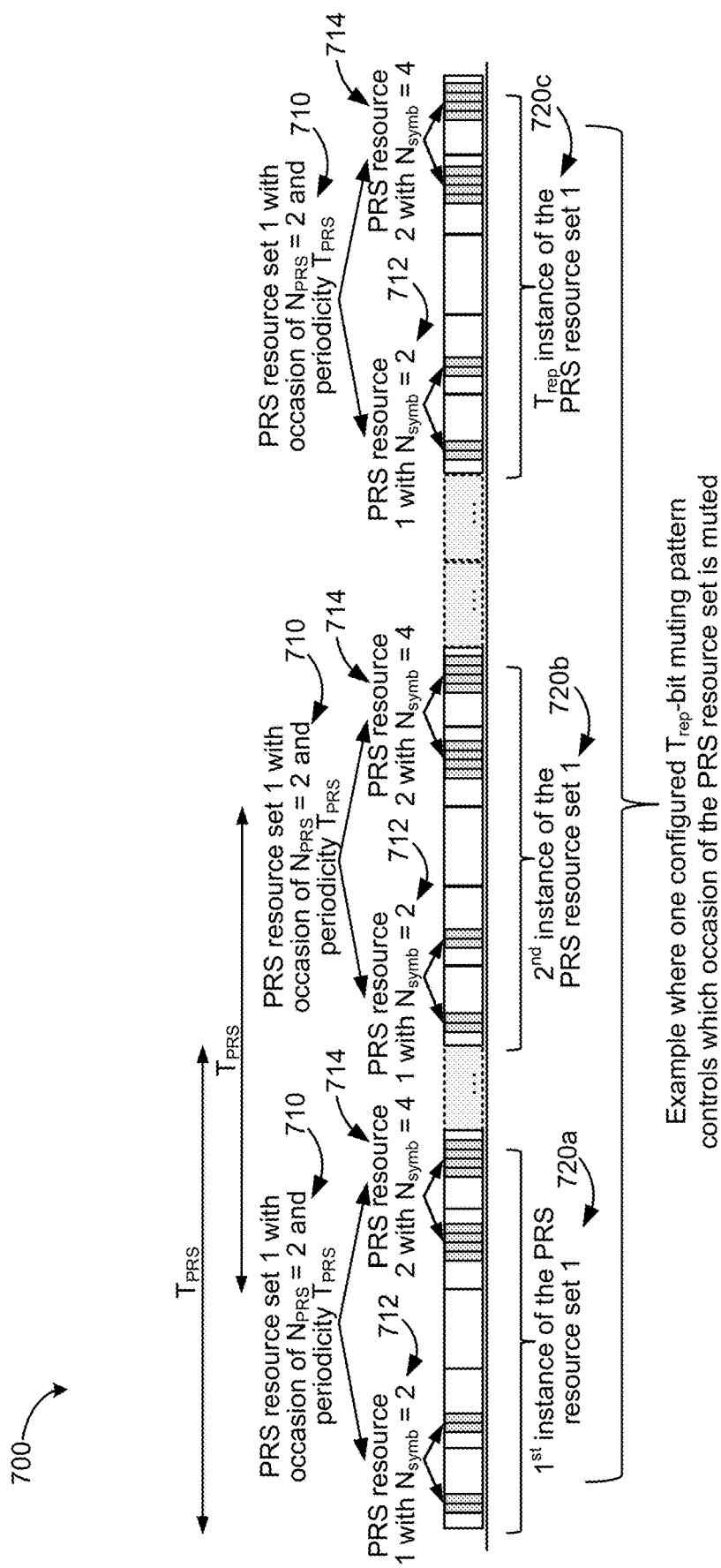
FIG. 7 is a diagram of an exemplary PRS configuration for the PRS transmissions of a given base station, according to aspects of the disclosure.

FIG. 7 is a diagram of an exemplary PRS configuration 700 for the PRS transmissions of a given base station, according to aspects of the disclosure. In FIG. 7, time is represented horizontally, increasing from left to right. Each long rectangle represents a slot and each short (shaded) rectangle represents an OFDM symbol. The PRS configuration 700 identifies the PRS resources 712 and 714 of a PRS resource set 710 during which the base station transmits PRS. The PRS resource set 710 has an occasion length $N_{PRS}$ of two (2) slots and a periodicity of $T_{PRS}$ (e.g., 160 subframes or 160 ms). As such, both the PRS resources 712 and 714 are two consecutive slots in length and repeat every $T_{PRS}$ subframes, starting from the slot in which the first symbol of the respective PRS resource occurs.

In the example of FIG. 7, the PRS resource set 710 includes two PRS resources, a first PRS resource 712 (labeled "PRS resource 1" in FIG. 7) and a second PRS resource 714 (labeled "PRS resource 2" in FIG. 7). The PRS resource 712 and the PRS resource 714 may be transmitted on separate beams of the same base station. The PRS resource 712 has a symbol length $N_{symb}$ of two (2) symbols, and the PRS resource 714 has a symbol length $N_{symb}$ of four (4) symbols.

Each instance of the PRS resource set 710, illustrated as instances 720a, 720b, and 720c, includes an occasion of length '2' (i.e., $N_{PRS}=2$) for each PRS resource 712, 714 of the PRS resource set. The PRS resources 712 and 714 are repeated every $T_{PRS}$ subframes up to the muting sequence periodicity $T_{REP}$. As such, a bitmap of length $T_{REP}$ would be needed to indicate which occasions of instances 720a, 720b, and 720c are muted.

In an aspect, there may be additional constraints on a PRS configuration, such as PRS configuration 700 illustrated in FIG. 7. For example, for all PRS resources (e.g., PRS resources 712, 714) of a PRS resource set (e.g., PRS resource set 710), the base station can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the subcarrier spacing and the cyclic prefix being the same for one base station or for all base stations.

The present disclosure provides techniques for reducing the overhead of signaling muting pattern configurations for downlink PRS. As a first technique, for each PRS resource set (e.g., PRS resource set 710), a muting pattern can be assigned across PRS occasions that controls the muting of a specific subgroup of PRS resources (e.g., PRS resources 712, 714) of the PRS resource set for each PRS occasion. A subgroup of PRS resources (also referred to as a repetition of PRS resources) can have the same muting pattern across PRS occasions. A bitmap of some size 'X' can be configured for each subgroup of the PRS resource set, where the base station repeats the muting pattern in that PRS resource set after X PRS occasions. There can be as many as Y PRS resources in the PRS resource set, and therefore, as many as Y PRS resource subgroups if each subgroup has only one PRS resource. Note that while a muting pattern is defined per PRS resource set, there could be multiple muting patterns per PRS resource set, one for each subgroup of PRS resources.

For example, a subgroup may contain all the PRS resources of a PRS resource set (e.g., both PRS resources 712 and 714), which would result in the same muting pattern across time for all of the beams of that PRS resource set of that base station. This configuration would result in a small configuration overhead, but low flexibility. As another example, each subgroup may contain only one PRS resource (e.g., one of PRS resources 712 and 714), in which case, the PRS resource set would contain Y subgroups, where 'Y' is the number of PRS resources in the PRS resource set, and the PRS transmitted on each beam would have a different muting pattern. This configuration would result in a large configuration overhead but high flexibility.

Figures 8, 10:

FIG. 8 illustrates a table 800 of an exemplary muting pattern for a given PRS resource set i, according to aspects of the disclosure. The columns of table 800 correspond to the subgroups of PRS resources in the PRS resource set i (labeled as "PRS Group ID"), and are numbered from '0' to $N_{group}^{(i)}-1$. The rows of table 800 correspond to the PRS occasions within the subgroups of PRS resources in the PRS resource set i (labeled "OCC ID"), and are numbered from '0' to $N_{occasions}^{(i)}-1$. The values $N_{occasions}^{(i)}$ and $N_{group}^{(i)}$ are configurable (i.e., can be different) for each PRS resource set of each base station. Likewise, the contents (i.e., the values in the rows) of each of the $N_{group}^{(i)}$ group subgroups of PRS resources are configurable (i.e., can be different) for each PRS resource set.

In the example of FIG. 8, for simplicity, only the contents of the first subgroup of PRS resources (PRS Group ID=0) are shown. As further illustrated in FIG. 8, there are $N_{occasions}^{(i)}=16$ PRS occasions, and as such, there are 16 rows, numbered from '0' to $N_{occasions}^{(i)}-1$. However, as will be appreciated, there may be more or fewer than 16 occasions. Because there are 16 occasions, a 16-bit bitmap would be needed for each configured subgroup of PRS resources of the PRS resource set i.

Referring back to FIG. 7, a first subgroup of PRS resources of the PRS resource set 710 may contain the first PRS resource 712, and a second subgroup of PRS resources may contain the second PRS resource 714. As such, the UE would be configured with two muting pattern bitmaps, one for each subgroup, allowing the two subgroups to be ON (e.g., active, not muted) or OFF (i.e., inactive, muted) independent of each other. That is, in some occasions, first PRS resource 712 may be transmitted and second PRS resource 714 may be muted, or vice versa, or both may be muted, or both may be transmitted. Note that each subgroup will still have an $N_{PRS}$ of '2' and a periodicity of $T_{PRS}$.

Dividing the PRS resources of a PRS resource set into subgroups with the same muting pattern reduces signaling overhead between the UE and the base station. Specifically, as noted above, a PRS resource set is defined as a collection of PRS resources (or beams) with the same periodicity. The UE may be able to report a positioning resource indication (PRI) related to which beam is the best inside the PRS resource set. However, it may not be desirable to have the same muting pattern for all of the beams of the PRS resource set. At the same time, it may not be desirable to always have a different muting pattern across all PRS resources.

For example, a base station may transmit a PRS resource set of 16 PRS resources on 16 transmit beams, and every fourth beam may already be considered highly spatially separated, and therefore do not interfere with each other (meaning they are spatially muted). As such, the base station can group every fourth beam into a subgroup of PRS resources, for a total of four subgroups. All that is needed then is to provide time-domain muting across the four PRS subgroups. To avoid excessive overhead, the base station can provide the UE with four $N_{occasions}$-bit bitmaps, one for each PRS subgroup, rather than having to provide 16 X-bit bitmaps (i.e., one for each PRS resource) in which the muting pattern for every fourth PRS resource/beam is exactly the same.

In an aspect, subgroups of PRS resources may only be created when the X-bit muting pattern has an X larger than a threshold.

In an aspect, not providing any subgroups in the PRS muting configuration can be interpreted as either all PRS resources being in the same group, or each PRS resource being in its own group.

As a further technique described herein, for a set of configured muting pattern periodicities ($T_{PRS}$), the base station can assign a muting pattern across PRS occasions that controls the muting of each subgroup of PRS resources of each PRS resource set of that base station that has the given periodicity. More specifically, the number of PRS subgroups $N_{group}^{(i)}$ may be configurable for each periodicity, and the number of PRS occasions $N_{occasions}^{(i)}$ may be configurable for each PRS resource set. The base station can configure an $N_{occasions}^{(i)}$-bit bitmap for each subgroup of each PRS resource set when the base station wants to repeat the muting pattern in that set after $N_{occasions}$ occasions.

FIG. 9 illustrates a table 900 of an exemplary muting pattern for an ordered sequence of PRS resource sets with the same periodicity, according to aspects of the disclosure. The columns of table 900 correspond to the subgroups of PRS resources in the PRS resource sets. A first PRS resource set has $N_{group}^{(1)}$ subgroups of PRS resources, a second PRS resource set has $N_{group}^{(2)}$ subgroups of PRS resources, a third PRS resource set has $N_{group}^{(3)}$ subgroups of PRS resources, and so on. The rows of table 900 correspond to the PRS occasions within the subgroups of PRS resources in the PRS resource sets, and are numbered from '0' to $N_{occasions}^{(i)}-1$.

In an aspect, there is an option to not configure any PRS subgroups in any of the PRS resource sets, which would result in all PRS resources of all PRS resource sets with the same periodicity having the same muting pattern. In addition, there may be an option to configure the same muting patterns for all PRS resource sets, independent of periodicity. This would result in the minimum configuration overhead, since the base station would only have to provide one bitmap for all PRS resources of all PRS resource sets of a given periodicity.

Currently, a PRS resource set with $N_{resources}$ PRS resources can be associated with up to $N_{muting}$ $T_{REP}$-bit muting pattern(s), where each bit of the muting pattern bitmap indicates whether a corresponding PRS occasion of the associated subgroup of PRS resources of the PRS resource set is muted or not. Currently, an $N_{groups}$ of '1' is supported, an $N_{muting}$ of '1' is supported, and a $T_{REP}$ of {2,4,8,16} is supported. Note that it should be possible to configure the same $N_{muting}$ muting pattern(s) for all PRS resource sets of a base station even if they have different periodicities.

To further reduce PRS configuration overhead, a base station can provide one $N_{occasions}^{(i)}$-bit bitmap associated with the first PRS subgroup of a PRS resource set i (as in the first technique described herein) or of a periodicity (as in the second technique described herein). The UE can then derive the remaining $N_{occasions}^{(i)}$-bit bitmaps associated with the remaining PRS subgroups using a deterministic function (e.g., cyclic shift index, permutation index), a randomized function, or the like.

FIG. 10 illustrates a table 1000 of an exemplary muting pattern for a given PRS resource set i, according to aspects of the disclosure. The columns of table 1000 correspond to the subgroups of PRS resources in the PRS resource set i (labeled as "PRS Group ID"), and are numbered from '0' to $N_{group}^{(i)}-1$. The rows of table 1000 correspond to the PRS occasions within the subgroups of PRS resources in the PRS resource set i (labeled "OCC ID"), and are numbered from '0' to $N_{occasions}^{(i)}-1$. In the example of FIG. 10, the base station only transmits the first column of table 1000 as the muting pattern. The UE can then derive the remaining columns of table 1000. For example, the UE may use a deterministic function, such as a cyclic shift index, as shown in FIG. 11.

FIG. 11 illustrates a table 1100 of an exemplary muting pattern for a given PRS resource set i, according to aspects of the disclosure. The columns of table 1100 correspond to the subgroups of PRS resources in the PRS resource set i (labeled as "PRS Group ID"), and are numbered from '0' to $N_{group}^{(i)}-1$ The rows of table 1100 correspond to the PRS occasions within the subgroups of PRS resources in the PRS resource set i (labeled "OCC ID"), and are numbered from '0' to $N_{occasions}^{(i)}-1$.

In the example of FIG. 11, the base station only transmits the first column of table 1100 as the muting pattern. In addition, the base station sends a parameter, $c_1$, in the configuration, which may be a cyclic shift index or a permutation index. In this case, the muting pattern of each subgroup changes compared to the configured $N_{occasions}^{(i)}$-bit bitmap (i.e., the first column of table 1100), without the base station having to provide the bitmaps for each subgroup of PRS resources (i.e., the entire table 1100). For example, as shown in FIG. 11, if $c_1$ is a cyclic shift equal to '1,' then in the first column (provided by the base station), the second occasion is muted, in the second column (for the next subgroup of PRS resources), the third occasion is muted, in the third column, the fourth occasion is muted, and so on.

FIG. 12 illustrates a table 1200 of an exemplary muting pattern for a given PRS resource set i, according to aspects of the disclosure. The columns of table 1200 correspond to the subgroups of PRS resources in the PRS resource set i (labeled as "PRS Group ID"), and are numbered from '0' to $N_{group}^{(i)}-1$. The rows of table 1200 correspond to the PRS occasions within the subgroups of PRS resources in the PRS resource set i (labeled "OCC ID"), and are numbered from '0' to $N_{occasions}^{(i)}-1$.

In the example of FIG. 12, the base station only transmits the first column of table 1200 as the muting pattern. In addition, the base station sends a parameter, $c_i$, for each subgroup of PRS resources (i.e., each column of table 1200) in the configuration, which may be a cyclic shift index or a permutation index. In this case, the muting pattern of each subgroup changes compared to the configured $N_{occasions}^{(i)}$-bit bitmap (i.e., the first column of table 1200), without the base station having to provide the entire ($N_{occasions}^{(i)} \times N_{group}^{(i)}$)-bit bitmap for all subgroups of PRS resources of the PRS resource set i (i.e., the entire table 1200). The UE can derive the muting patterns for the subsequent subgroups (or columns of table 1200) based on the parameter $c_i$.

For example, if the parameter $c_i$ is a permutation index, the UE can apply the corresponding permutation to the first column of table 1200 to derive the remaining columns of table 1200. More specifically, there may be $N_{occasions}^{(i)}!$ (i.e., $N_{occasions}^{(i)}$ factorial) different permutations of muting patterns that can be configured for the $N_g$ subgroups of PRS occasions. The base station may determine which permutations are appropriate (e.g., which muting pattern permutations will provide good hearability for PRS) and signal the index values of such permutations to the UE as the parameters $c_i$. The UE can then determine the muting pattern for the second PRS subgroup $N_{group}^{(1)}$ by calculating or looking up the $c_1^{th}$ permutation of the muting pattern for the first PRS subgroup $N_{group}^{(0)}$ and using that permutation as the muting pattern for the second PRS subgroup $N_{group}^{(1)}$.

In an aspect, the location server (e.g., location server 230, LMF 270, SLP 272) can signal the PRS configuration and muting pattern to the involved base stations over New Radio positioning protocol type A (NRPPa) or LTE positioning protocol type A (LPPa), and to the UE over LPP (e.g., in the PRS-Info message).

Figure 13:
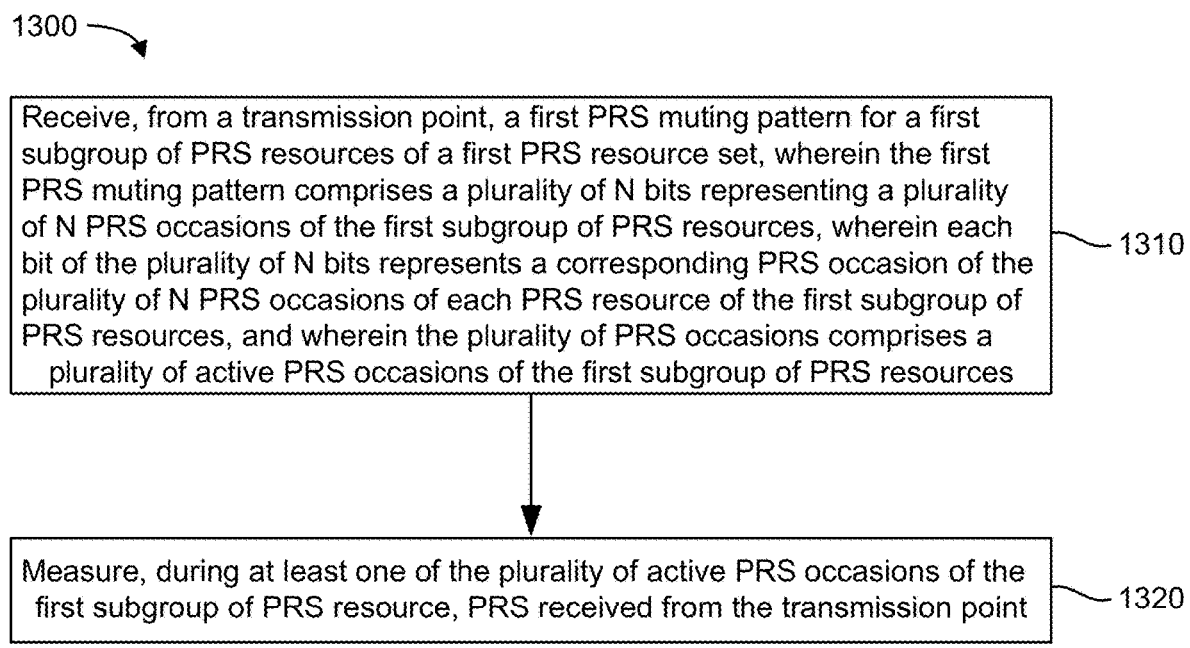
FIGS. 13 and 14 illustrate exemplary methods of wireless communication, according to aspects of the disclosure.

FIG. 13 illustrates an exemplary method 1300 of wireless communication, according to aspects of the disclosure. In an aspect, the method 1300 may be performed by a UE, such as any of the UEs described herein.

At 1310, the UE receives, from a transmission point, a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active (i.e., ON, not muted) PRS occasions of the first subgroup of PRS resources. In an aspect, operation 1310 may be performed by WWAN transceiver(s) 310, processing system 332, memory component 340, and/or muting pattern manager 342, any or all of which may be considered as means for performing this operation.

At 1320, the UE measures, during at least one of the plurality of active PRS occasions of the first subgroup of PRS resources, PRS received from the transmission point. In an aspect, operation 1320 may be performed by WWAN transceiver(s) 310, processing system 332, memory component 340, and/or muting pattern manager 342, any or all of which may be considered as means for performing this operation.

In an aspect, the method 1300 may further include (not shown) estimating, by the UE, a location of the UE based on the measured PRS. Alternatively, or additionally, the UE may report the measured PRS to a positioning entity (e.g., location server 230, LMF 270) to enable the positioning entity to calculate a location of the UE. The PRS may be used (by the UE or the positioning entity) to estimate the location of the UE using various positioning techniques, such as multi-cell RTT, AoA/AoD, etc.

Figure 14:
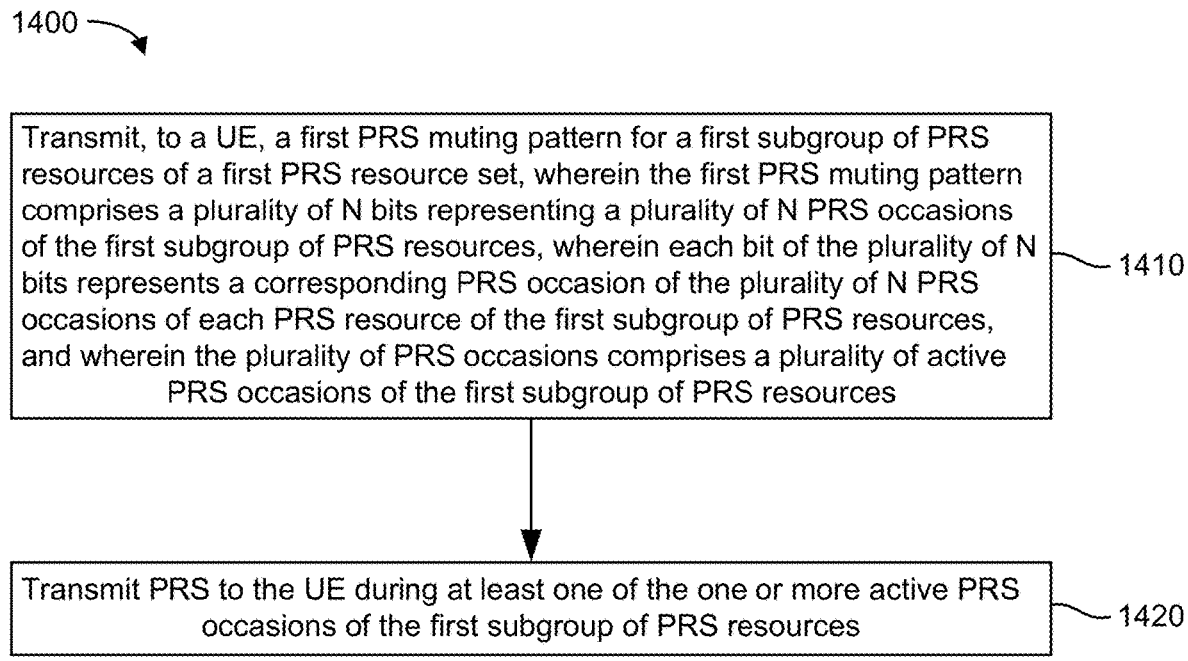

FIG. 14 illustrates an exemplary method 1400 of wireless communication, according to aspects of the disclosure. In an aspect, the method 1400 may be performed by a transmission point, such as a base station (e.g., any of the base stations described herein), an antenna or antenna array of a base station, a RRH, a DAS, etc.

At 1410, the transmission point transmits, to a UE (e.g., any of the UEs described herein), a first PRS muting pattern for a first subgroup of PRS resources of a first PRS resource set, wherein the first PRS muting pattern comprises a plurality of N bits representing a plurality of N PRS occasions of the first subgroup of PRS resources, wherein each bit of the plurality of N bits represents a corresponding PRS occasion of the plurality of N PRS occasions of each PRS resource of the first subgroup of PRS resources, and wherein the plurality of N PRS occasions comprises a plurality of active PRS occasions of the first subgroup of PRS resources. In an aspect, operation 1410 may be performed by WWAN transceiver(s) 350, processing system 384, memory component 386, and/or muting pattern manager 388 as shown in FIGS. 3A-3C, any or all of which may be considered as means for performing this operation.

At 1420, the transmission point transmits PRS to the UE during at least one of the plurality of active PRS occasions of the first subgroup of PRS resources. In an aspect, operation 1420 may be performed by WWAN transceiver(s) 350, processing system 384, memory component 386, and/or muting pattern manager 388 as shown in FIGS. 3A-3C, any or all of which may be considered as means for performing this operation.

As will be appreciated, a technical advantage of the methods illustrated in FIGS. 13 and 14 is to reduce the overhead of signaling muting pattern configurations for downlink PRS.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
receiving, from a transmission point, a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
measuring, during at least one of the plurality of active repetitions of the first subgroup of PRS resources, PRS received from the transmission point.

2. The method of claim 1, wherein the first PRS resource set comprises a plurality of subgroups of PRS resources, including the first subgroup of PRS resources.

3. The method of claim 2, wherein a number of repetitions of each of the plurality of subgroups of PRS resources is configurable across the plurality of subgroups of PRS resources.

4. The method of claim 2, wherein a number of PRS resources in each of the plurality of subgroups of PRS resources is configurable across the plurality of subgroups of PRS resources.

5. The method of claim 2, further comprising:
receiving, from the transmission point, a PRS muting pattern for each of the plurality of subgroups of PRS resources, the PRS muting patterns including the first PRS muting pattern.

6. The method of claim 2, wherein, based on N being greater than a threshold, the first PRS resource set is divided into the plurality of subgroups of PRS resources.

7. The method of claim 2, further comprising:
deriving a PRS muting pattern for each subgroup of PRS resources of the plurality of subgroups of PRS resources other than the first subgroup of PRS resources based on the first PRS muting pattern.

8. The method of claim 7, wherein each subgroup of PRS resources of the first PRS resource set has a same PRS muting pattern in each repetition.

9. The method of claim 7, wherein the deriving comprises:
applying a deterministic function to the first PRS muting pattern to generate the PRS muting pattern for each subgroup of PRS resources of the plurality of subgroups of PRS resources other than the first subgroup of PRS resources.

10. The method of claim 9, wherein the deterministic function comprises a cyclic shift function or a permutation function.

11. The method of claim 10, further comprising:
receiving, from the transmission point, a parameter representing a cyclic shift index for the cyclic shift function or a permutation index for the permutation function.

12. The method of claim 7, wherein the deriving comprises:
applying a random function to the first PRS muting pattern to generate the PRS muting pattern for each subgroup of PRS resources of the plurality of subgroups of PRS resources other than the first subgroup of PRS resources.

13. The method of claim 2, wherein each of the plurality of subgroups of PRS resources, including the first subgroup of PRS resources, comprises one PRS resource of the first PRS resource set.

14. The method of claim 1, further comprising:
receiving, from the transmission point, a PRS muting pattern for at least one subgroup of PRS resources of each of a plurality of PRS resource sets associated with the transmission point, the PRS muting patterns including the first PRS muting pattern and the plurality of PRS resource sets comprising the first PRS resource set.

15. The method of claim 14, wherein all subgroups of PRS resources of a first group of PRS resource sets of the plurality of PRS resource sets have a first periodicity, and wherein all subgroups of PRS resources of a second group of PRS resource sets of the plurality of PRS resource sets have a second periodicity.

16. The method of claim 15, wherein all subgroups of PRS resources of the first group of PRS resource sets have the same PRS muting pattern.

17. The method of claim 15, wherein all subgroups of PRS resources of all of the plurality of PRS resource sets have the same PRS muting pattern.

18. The method of claim 17, wherein the plurality of PRS resource sets have different periodicities.

19. The method of claim 14, wherein a subcarrier spacing and a cyclic prefix are the same for all PRS resources of the plurality of PRS resource sets or for all PRS resources of all PRS resource sets associated with all transmission points from which the UE receives PRS.

20. The method of claim 1, wherein all PRS resources of the first PRS resource set have a same repetition length, a same number of symbols, a same comb-type, a same bandwidth, or any combination thereof.

21. The method of claim 1, wherein the first subgroup of PRS resources comprises all PRS resources of the first PRS resource set.

22. The method of claim 1, wherein the first PRS resource set includes a plurality of PRS resources, and wherein each of the plurality of PRS resources corresponds to a subgroup of PRS resources.

23. The method of claim 1, wherein the transmission point comprises a base station, an antenna or antenna array of the base station, a remote radio head (RRH), or a distributed antenna system (DAS).

24. The method of claim 1, wherein the plurality of N repetitions further comprises one or more muted repetitions of the first subgroup of PRS resources.

25. A method of wireless communication performed by a transmission point, comprising:
transmitting, to a user equipment (UE), a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
transmitting PRS to the UE during at least one of the plurality of active repetitions of the first subgroup of PRS resources.

26. The method of claim 25, wherein the first PRS resource set comprises a plurality of subgroups of PRS resources, including the first subgroup of PRS resources.

27. The method of claim 26, wherein a number of repetitions of each of the plurality of subgroups of PRS resources is configurable across the plurality of subgroups of PRS resources.

28. The method of claim 26, wherein a number of PRS resources in each of the plurality of subgroups of PRS resources is configurable across the plurality of subgroups of PRS resources.

29. The method of claim 26, further comprising:
transmitting, to the UE, a PRS muting pattern for each of the plurality of subgroups of PRS resources, the PRS muting patterns including the first PRS muting pattern.

30. The method of claim 26, wherein, based on N being greater than a threshold, the first PRS resource set is divided into the plurality of subgroups of PRS resources.

31. The method of claim 26, wherein each of the plurality of subgroups of PRS resources, including the first subgroup of PRS resources, comprises one PRS resource of the first PRS resource set.

32. The method of claim 25, further comprising:
transmitting, to the UE, a PRS muting pattern for at least one subgroup of PRS resources of each of a plurality of PRS resource sets associated with the transmission point, the PRS muting patterns including the first PRS muting pattern and the plurality of PRS resource sets comprising the first PRS resource set.

33. The method of claim 32, wherein all subgroups of PRS resources of a first group of PRS resource sets of the plurality of PRS resource sets have a first periodicity, and wherein all subgroups of PRS resources of a second group of PRS resource sets of the plurality of PRS resource sets have a second periodicity.

34. The method of claim 33, wherein all subgroups of PRS resources of the first group of PRS resource sets have the same PRS muting pattern.

35. The method of claim 33, wherein all subgroups of PRS resources of all of the plurality of PRS resource sets have the same PRS muting pattern regardless of periodicity.

36. The method of claim 35, wherein the plurality of PRS resource sets have different periodicities.

37. The method of claim 32, wherein a subcarrier spacing and a cyclic prefix are the same for all PRS resources of the plurality of PRS resource sets or for all PRS resources of all PRS resource sets associated with all transmission points from which the UE receives PRS.

38. The method of claim 25, wherein all PRS resources of the first PRS resource set have a same repetition length, a same number of symbols, a same comb-type, a same bandwidth, or any combination thereof.

39. The method of claim 25, wherein the first subgroup of PRS resources comprises all PRS resources of the first PRS resource set.

40. The method of claim 25, wherein the first PRS resource set includes a plurality of PRS resources, and wherein each of the plurality of PRS resources corresponds to a subgroup of PRS resources.

41. The method of claim 25, wherein the transmission point comprises a base station, an antenna or antenna array of the base station, a remote radio head (RRH), or a distributed antenna system (DAS).

42. The method of claim 25, further comprising:
receiving, from the UE, a measurement of at least one PRS transmitted by the transmission point during the at least one of the plurality of active repetitions of the first subgroup of PRS resources.

43. The method of claim 25, wherein the plurality of N repetitions further comprises one or more muted repetitions of the first subgroup of PRS resources.

44. A user equipment (UE), comprising:
a memory;
at least one transceiver; and
at least one processor communicatively coupled to the memory and the at least one transceiver, the at least one processor configured to:
receive, from a transmission point via the at least one transceiver, a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and at least one processor of the UE configured to:
measure, during at least one of the plurality of active repetitions of the first subgroup of PRS resources, PRS received from the transmission point.

45. The UE of claim 44, wherein the first PRS resource set comprises a plurality of subgroups of PRS resources, including the first subgroup of PRS resources.

46. The UE of claim 45, wherein a number of repetitions of each of the plurality of subgroups of PRS resources is configurable across the plurality of subgroups of PRS resources.

47. The UE of claim 45, wherein a number of PRS resources in each of the plurality of subgroups of PRS resources is configurable across the plurality of subgroups of PRS resources.

48. The UE of claim 45, wherein the at least one processor is further configured to:
receive, from the transmission point via the at least one transceiver, a PRS muting pattern for each of the plurality of subgroups of PRS resources, the PRS muting patterns including the first PRS muting pattern.

49. The UE of claim 45, wherein, based on N being greater than a threshold, the first PRS resource set is divided into the plurality of subgroups of PRS resources.

50. The UE of claim 45, wherein the at least one processor is further configured to:
derive a PRS muting pattern for each subgroup of PRS resources of the plurality of subgroups of PRS resources other than the first subgroup of PRS resources based on the first PRS muting pattern.

51. The UE of claim 50, wherein each subgroup of PRS resources of the first PRS resource set has a same PRS muting pattern in each repetitions.

52. The UE of claim 50, wherein the at least one processor being configured to derive comprises the at least one processor being configured to:
apply a deterministic function to the first PRS muting pattern to generate the PRS muting pattern for each subgroup of PRS resources of the plurality of subgroups of PRS resources other than the first subgroup of PRS resources.

53. The UE of claim 52, wherein the deterministic function comprises a cyclic shift function or a permutation function.

54. The UE of claim 53, wherein the at least one processor is further configured to:
receive, from the transmission point via the at least one transceiver, a parameter representing a cyclic shift index for the cyclic shift function or a permutation index for the permutation function.

55. The UE of claim 50, wherein the at least one processor being configured to derive comprises the at least one processor being configured to:
apply a random function to the first PRS muting pattern to generate the PRS muting pattern for each subgroup of PRS resources of the plurality of subgroups of PRS resources other than the first subgroup of PRS resources.

56. The UE of claim 45, wherein each of the plurality of subgroups of PRS resources, including the first subgroup of PRS resources, comprises one PRS resource of the first PRS resource set.

57. The UE of claim 44, wherein the at least one processor is further configured to:
receive, from the transmission point via the at least one transceiver, a PRS muting pattern for at least one subgroup of PRS resources of each of a plurality of PRS resource sets associated with the transmission point, the PRS muting patterns including the first PRS muting pattern and the plurality of PRS resource sets comprising the first PRS resource set.

58. The UE of claim 57, wherein all subgroups of PRS resources of a first group of PRS resource sets of the plurality of PRS resource sets have a first periodicity, and wherein all subgroups of PRS resources of a second group of PRS resource sets of the plurality of PRS resource sets have a second periodicity.

59. The UE of claim 58, wherein all subgroups of PRS resources of the first group of PRS resource sets have the same PRS muting pattern.

60. The UE of claim 58, wherein all subgroups of PRS resources of all of the plurality of PRS resource sets have the same PRS muting pattern.

61. The UE of claim 60, wherein the plurality of PRS resource sets have different periodicities.

62. The UE of claim 57, wherein a subcarrier spacing and a cyclic prefix are the same for all PRS resources of the plurality of PRS resource sets or for all PRS resources of all PRS resource sets associated with all transmission points from which the UE receives PRS.

63. The UE of claim 44, wherein all PRS resources of the first PRS resource set have a same repetition length, a same number of symbols, a same comb-type, a same bandwidth, or any combination thereof.

64. The UE of claim 44, wherein the first subgroup of PRS resources comprises all PRS resources of the first PRS resource set.

65. The UE of claim 44, wherein the first PRS resource set includes a plurality of PRS resources, and wherein each of the plurality of PRS resources corresponds to a subgroup of PRS resources.

66. The UE of claim 44, wherein the transmission point comprises a base station, an antenna or antenna array of the base station, a remote radio head (RRH), or a distributed antenna system (DAS).

67. The UE of claim 44, wherein the plurality of N repetitions further comprises one or more muted repetitions of the first subgroup of PRS resources.

68. A transmission point, comprising:
a memory;
at least one transceiver; and
at least one processor communicatively coupled to the memory and the at least one transceiver, the at least one processor configured to:
cause the at least one transceiver to transmit, to a user equipment (UE), a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
cause the at least one transceiver to transmit PRS to the UE during at least one of the plurality of active repetitions of the first subgroup of PRS resources.

69. The transmission point of claim 68, wherein the first PRS resource set comprises a plurality of subgroups of PRS resources, including the first subgroup of PRS resources.

70. The transmission point of claim 69, wherein a number of repetitions of each of the plurality of subgroups of PRS resources is configurable across the plurality of subgroups of PRS resources.

71. The transmission point of claim 69, wherein a number of PRS resources in each of the plurality of subgroups of PRS resources is configurable across the plurality of subgroups of PRS resources.

72. The transmission point of claim 69, wherein the at least one processor is further configured to:
cause the at least one transceiver to transmit, to the UE, a PRS muting pattern for each of the plurality of subgroups of PRS resources, the PRS muting patterns including the first PRS muting pattern.

73. The transmission point of claim 69, wherein, based on N being greater than a threshold, the first PRS resource set is divided into the plurality of subgroups of PRS resources.

74. The transmission point of claim 69, wherein each of the plurality of subgroups of PRS resources, including the first subgroup of PRS resources, comprises one PRS resource of the first PRS resource set.

75. The transmission point of claim 68, wherein the at least one processor is further configured to:
cause the at least one transceiver to transmit, to the UE, a PRS muting pattern for at least one subgroup of PRS resources of each of a plurality of PRS resource sets associated with the transmission point, the PRS muting patterns including the first PRS muting pattern and the plurality of PRS resource sets comprising the first PRS resource set.

76. The transmission point of claim 75, wherein all subgroups of PRS resources of a first group of PRS resource sets of the plurality of PRS resource sets have a first periodicity, and wherein all subgroups of PRS resources of a second group of PRS resource sets of the plurality of PRS resource sets have a second periodicity.

77. The transmission point of claim 76, wherein all subgroups of PRS resources of the first group of PRS resource sets have the same PRS muting pattern.

78. The transmission point of claim 76, wherein all subgroups of PRS resources of all of the plurality of PRS resource sets have the same PRS muting pattern regardless of periodicity.

79. The transmission point of claim 78, wherein the plurality of PRS resource sets have different periodicities.

80. The transmission point of claim 75, wherein a subcarrier spacing and a cyclic prefix are the same for all PRS resources of the plurality of PRS resource sets or for all PRS resources of all PRS resource sets associated with all transmission points from which the UE receives PRS.

81. The transmission point of claim 68, wherein all PRS resources of the first PRS resource set have a same repetition length, a same number of symbols, a same comb-type, a same bandwidth, or any combination thereof.

82. The transmission point of claim 68, wherein the first subgroup of PRS resources comprises all PRS resources of the first PRS resource set.

83. The transmission point of claim 68, wherein the first PRS resource set includes a plurality of PRS resources, and wherein each of the plurality of PRS resources corresponds to a subgroup of PRS resources.

84. The transmission point of claim 68, wherein the transmission point comprises a base station, an antenna or antenna array of the base station, a remote radio head (RRH), or a distributed antenna system (DAS).

85. The transmission point of claim 68, wherein the at least one processor is further configured to:

receive, from the UE via the at least one transceiver, a measurement of at least one PRS transmitted by the transmission point during the at least one of the plurality of active repetitions of the first subgroup of PRS resources.

86. The transmission point of claim 68, wherein the plurality of N repetitions further comprises one or more muted repetitions of the first subgroup of PRS resources.

87. A user equipment (UE), comprising:
means for receiving, from a transmission point, a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
means for measuring, during at least one of the plurality of active repetitions of the first subgroup of PRS resources, PRS received from the transmission point.

88. A transmission point, comprising:
means for transmitting, to a user equipment (UE), a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
means for transmitting PRS to the UE during at least one of the plurality of active repetitions of the first subgroup of PRS resources.

89. A non-transitory computer-readable medium storing computer-executable instructions, the computer-executable instructions comprising:
at least one instruction instructing a user equipment (UE) to receive, from a transmission point, a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
at least one instruction instructing the UE to measure, during at least one of the plurality of active repetitions of the first subgroup of PRS resources, PRS received from the transmission point.

90. A non-transitory computer-readable medium storing computer-executable instructions, the computer-executable instructions comprising:
at least one instruction instructing a transmission point to send, to a user equipment (UE), a first positioning reference signal (PRS) muting pattern for a first subgroup of PRS resources of a first PRS resource set, wherein the first PRS muting pattern comprises a plurality of N bits representing a plurality of N repetitions of the first subgroup of PRS resources, wherein each bit of the plurality of N bits represents a corresponding repetition of the plurality of N repetitions of each PRS resource of the first subgroup of PRS resources, wherein the plurality of N repetitions comprises a plurality of active repetitions of the first subgroup of PRS resources, and wherein the first subgroup of PRS resources comprises a plurality of PRS resources of the first PRS resource set; and
at least one instruction instructing the transmission point to transmit PRS to the UE during at least one of the plurality of active repetitions of the first subgroup of PRS resources.

* * * * *